United States Patent
Wilks

[19]

[11] Patent Number: 6,086,083
[45] Date of Patent: Jul. 11, 2000

[54] TRAILER HITCH AND METHOD OF COUPLING

[76] Inventor: David J. Wilks, 4010 Robertsville Ave., Minerva, Ohio 44657

[21] Appl. No.: 09/012,981

[22] Filed: Jan. 26, 1998

[51] Int. Cl.$^7$ .......................................................... B60D 1/06
[52] U.S. Cl. ........................................ 280/479.1; 280/511
[58] Field of Search ..................................... 280/511, 477, 280/414.1, 479.1

[56] References Cited

U.S. PATENT DOCUMENTS

| | | | |
|---|---|---|---|
| 2,736,575 | 2/1956 | Gebhart | 280/477 |
| 3,159,368 | 12/1964 | Ahlbin | 280/511 |
| 3,596,925 | 8/1971 | Richie | 280/477 |
| 3,718,317 | 2/1973 | Hilmer | 280/511 |
| 3,767,230 | 10/1973 | DeVries | 280/477 |
| 5,005,852 | 4/1991 | Smyly | 280/477 |
| 5,085,408 | 2/1992 | Norton et al. | 280/477 |
| 5,405,160 | 4/1995 | Weaver | 280/477 |
| 5,882,029 | 3/1999 | Kennedy | 280/511 |

FOREIGN PATENT DOCUMENTS

| | | | |
|---|---|---|---|
| 2210837 | 6/1989 | United Kingdom | 280/477 |
| 90/10550 | 9/1990 | WIPO | 280/477 |

*Primary Examiner*—J. J. Swann
*Assistant Examiner*—Michael Cuff
*Attorney, Agent, or Firm*—Edward J. Holler

[57] ABSTRACT

A coupling device which can be readily transferred to other pairs of powered vehicles and unpowered trailer vehicles for over-the-road towing of the trailer vehicle. The device involves modified male and female contoured members such as complemental ball and socket members which can be easily brought together into mating engagement by a uniform cable member passed through continuous openings in both contoured male and female members and is capable of drawing together the paired vehicles into precise alignment and positively seating the coupled members into mating relation with minimal physical effort.

1 Claim, 2 Drawing Sheets

TRAILER HITCH AND METHOD OF COUPLING

This invention relates to a trailer hitch and method of coupling for joining two relatively movable vehicles, and more particularly, to a powered vehicle and an unpowered trailer vehicle for their combined coupling into towing relation.

BACKGROUND OF THE INVENTION

Many types of couplings have been known for joining one vehicle to another for towing purposes, particularly in over-the-road types of vehicles where a powered vehicle such as a tractor tows an unpowered trailer vehicle. In the known types of coupling structures or products, the joining of the vehicles has remained a problem since it has been essential to position the two vehicles in precisely-aligned relative locations for the coupling members to matingly engage. This precise locating of the vehicles has been especially difficult where the trailer vehicle comprises a heavy house trailer or a boat trailer supporting a heavy boat, for example. In these situations, it is often necessary for two or more persons to manually move the trailer tongue bearing the connecting member into precise coupling alignment with the complementary coupling member on the powered tractor vehicle.

A serious problem in hitching a trailer to another vehicle is that it is difficult, where the trailer may be parked on an incline or uneven ground, to back the tractor vehicle right up close and in alignment with the tongue of the trailer. Even if the terrain permits bringing the tractor into close proximity with the tongue of the trailer, it is difficult to precisely align the first and second coupling members on the two vehicles respectively. Where the weight of the trailer is such that it requires a strong lifting force, such as a jack-wheel, to elevate the trailer tongue to place the socket member over a complementary ball member, the operation is not easily completed due to misalignment problems. Ordinarily, the alignment problem prevails, requiring two or more persons to complete the coupling by physically moving the tongue laterally and the socket up and over the ball for their interconnection. In this situation, the weight of the trailer frequently requires considerable lifting for the tongue to be lifted and aligned over the ball to place the socket in seated relation.

FIELD OF THE INVENTION

The prior art has provided only partial solutions to the aforesaid problems. Various types of winches having hand-cranked cables have been mounted on a trailer for pulling the trailer to the tractor vehicle as disclosed in U.S. Pat. No. 5,085,408 to Norton et al. However, such art does not show adequate means for aligning the trailer socket with the hitch ball. The Norton reference requires a trailer jack attached to the trailer requiring one hand crank for the jack and a second hand crank for the winch. U.S. Pat. No. 5,080,386 to Lazar discloses a plate assembly together with the ball member for guiding the socket up and over the ball member. However, it does not disclose any means for providing a lifting force to the trailer tongue or force for pulling the trailer into proper coupling relation. U.S. Pat. No. 5,405,160 to Weaver requires a very complicated and costly trailer hitch assembly including a flat strap connected to the winch element. U.S. Pat. No. 2,736,575 to Gebhart requires a special cable having an enlarged tailored plug at the cable free end for fitting into a complemental recess in the ball member.

This invention is directed to solving such problems for a wide variety of towing vehicles and coupling situations permitting ready transferability of the coupling device to other trailing vehicles with only minimal modifications and requiring only single person effort to make the coupling. This is especially important where the person is elderly, handicapped or having limited physical strength.

Therefore, it is an object of the present invention to provide a coupling device and method for use with over-the-road vehicles of various types where it is unnecessary to accurately position the two vehicles in proper coupling relationship.

Another object of the present invention is to provide simpler and more economical means for drawing two vehicles into closely adjacent position for more efficient coupling of the two vehicles for highway travel, and which means may be utilized with various types of trailers with minimal modification of existing types of coupling members on tractor and trailer vehicles.

Another object of the present invention is to provide a coupling structure and method of coupling which may be more universally applied to existing vehicles having known coupling members mounted thereon for their coupling in a vastly improved manner without substantial alteration or modification of the existing coupling members.

A still further object of the present invention is to provide a coupling means and method of use which makes it possible to readily couple together two vehicles with minimal effort and manpower having existing coupling members on such vehicles, the said means being readily transferable to other towing and trailer vehicles having diverse characteristics.

SUMMARY OF THE INVENTION

The coupling device and method of the present invention involve a male member and a female member which are mounted on separate vehicles with coupling means on one of the vehicles for bringing the male and female members together without requiring additional means for moving of either of the vehicles into precisely aligned relation with the male and female members in positively coupled mating arrangement.

Further objects and advantages of the present invention will be readily apparent when taken in conjunction with the accompanying drawings.

DESCRIPTION OF THE PREFERRED EMBODIMENT

Figure 1:
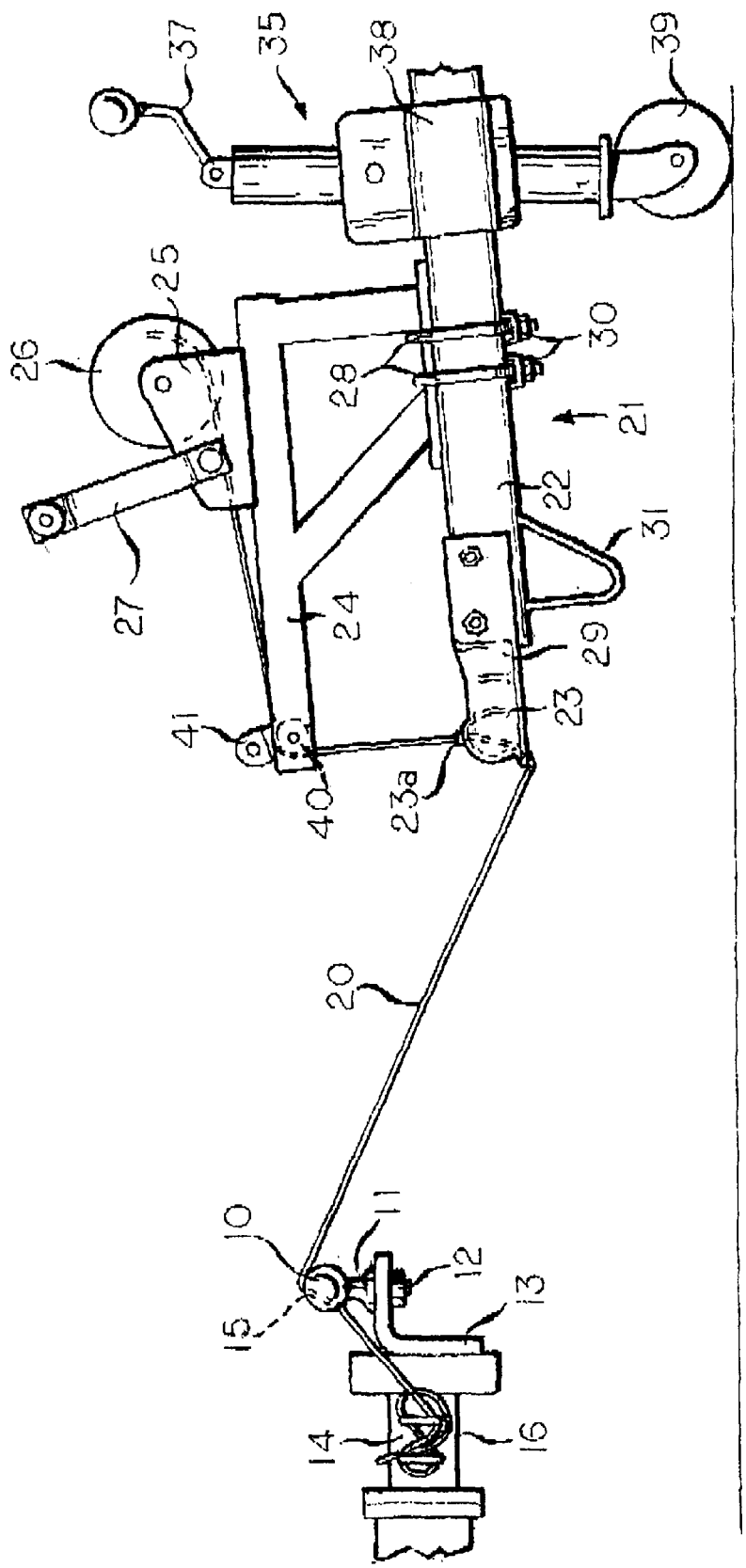
FIG. 1 is a side elevational view with component parts including male and female elements of the coupling device mounted on separate vehicles before interconnection is effected.

With reference to FIG. 1 of the drawings, a ball 10 is supported in the normal manner on a central rearward portion of a tractor vehicle such as a pickup truck or other powered vehicle. An upright stud 11 is secured by a nut 12 to a typical right-angled support member 13 projecting rearwardly of the vehicle with one supporting arm portion in horizontal relation. Support member 13 is fixedly attached to a horizontal support bar 14 extending beyond the rear bumper of the vehicle. A downwardly-facing angular opening 15 is formed in the ball 10 extending through its spherical shape and opening near a lower extremity or neck of the ball. A cleat member 16 is rigidly mounted on the horizontal support bar 14 adjacent to and below the ball. Bar 14 serves as a draw bar for the second or towing vehicle to be attached by the subject coupling device and method of coupling. The cleat member 16 serves to secure the terminating free end of cable 20 which extends from the second or trailer vehicle 21.

Trailer vehicle 21 has a forwardly-projecting tongue member 22 which supports a socket member 23 on a forwardmost area of the trailer tongue for coupling attachment to the ball 10. Socket 23 and ball 10 have complementary closely fitting contours for their mating interconnection. A generally L-shaped rigid frame or bracket member 24 is mounted on an upper region of the tongue 22 in parallel relationship with the tongue. Bracket member 24 serves to support a cable winch 25 on an upper region, the winch having a round drum 26 and a cable 20 wrapped therearound. A hand crank 27 is mounted on bracket 24 adjacent to the cable drum for drawing the cable around the drum when the hand crank is operated. A small electric motor powered by the electrical system of the powered vehicle may also be used to power the winch 25. The cable winch 25 serves to provide a pulling force to draw the two vehicles together to effect the coupling as stated hereinafter. Bracket 24 is temporarily rigidly mounted on the tongue 22 such as by a pair of U-shaped clamps 28 which fit over and partially around the tongue 22. The U-shaped clamps 28 each have threaded lower end portions on which nuts 30 are attached to secure the winch bracket to the trailer tongue. The bracket 24 and cable winch 25 are readily transferable to another trailer vehicle as desired by removing the clamps 28 from the trailer tongue 22 and similarly mounting the bracket 24 and winch 25 onto a second trailer or other vehicle to be towed. Bracket 24 has sufficient vertical height over the trailer tongue 22 to permit locating of a locking mechanism (not shown) on the tongue closely adjacent to socket 23. The locking mechanism usually consists of a projecting movable tang which is operable by a projecting lever and fits closely against the ball 10 after the ball is seated in the socket to effectively lock the coupling components together for safe travel.

The socket 23 is normally mounted on a socket supporting member 29 rigidly attached to a frontal extremity of the trailer tongue. A downwardly-projecting skid member 31 is frequently attached to a lower portion of the tongue front end. Socket 23 has an opening in its upper portion through which the cable 20 can be freely passed. Both openings in socket 23 and ball 10 have a sufficiently large diameter such as 3/8 inch holes to allow for free passage of the cable 20 therethrough. Bracket 24 has sufficient height over the trailer tongue 22 to permit location of a locking mechanism on the tongue upper portion, as stated, closely adjacent to the socket 23.

Cable 20 is preferably comprised of a multistrand steel cable having a diameter of about 1/4 to 1/2 inch and preferably 3/16 inch, and a tensile-test strength of about 4 to 5 tons. A rope may also be used instead of a steel cable.

The drawings in FIG. 1 show a jackwheel 35 which is frequently rigidly mounted on the trailer tongue 22 in vertical relation to permit mechanical lifting of the trailer tongue. While many known types of trailers have a jackwheel mounted on a forward portion of the tongue for easier movement of the trailer, a jackwheel is not necessary or required for practicing the present invention. The jackwheel, when one exists, is usually operated by a hand crank 37 to lift the tongue by a screw-threaded vertical shaft journaled in a similarly-threaded sleeve 38 above a freely-rotatable wheel 39 to move the tongue vertically and permit free rotation of the wheel when supporting the trailer tongue. However, as stated, the jackwheel is not required for use of the present invention, but fully eliminated by the present coupling and method of use.

Figure 2:
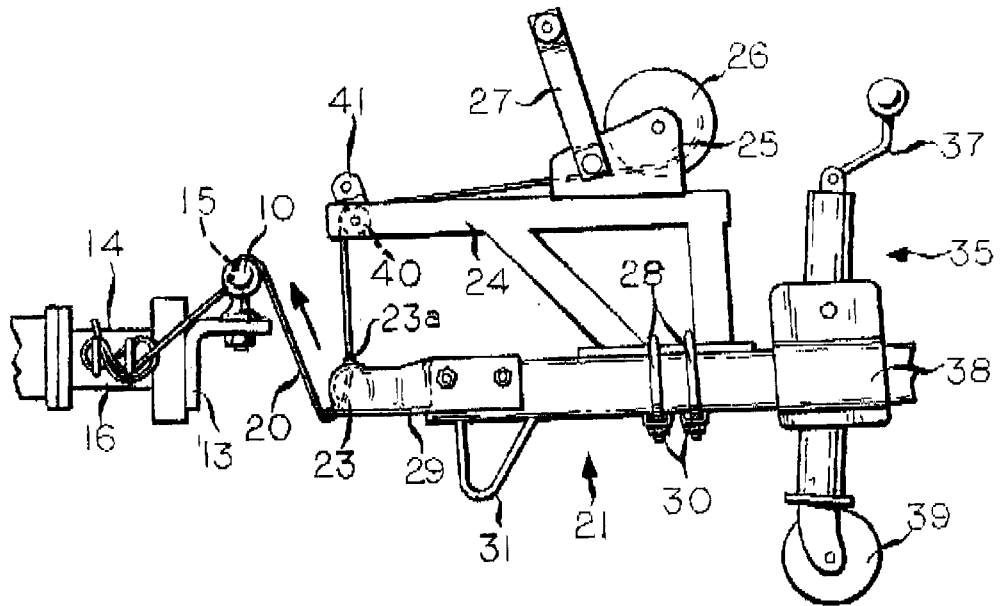
FIG. 2 is another side elevational view similar to FIG. 1 during drawing of the two vehicles together just prior to effecting coupling of the vehicles.
Figure 3:
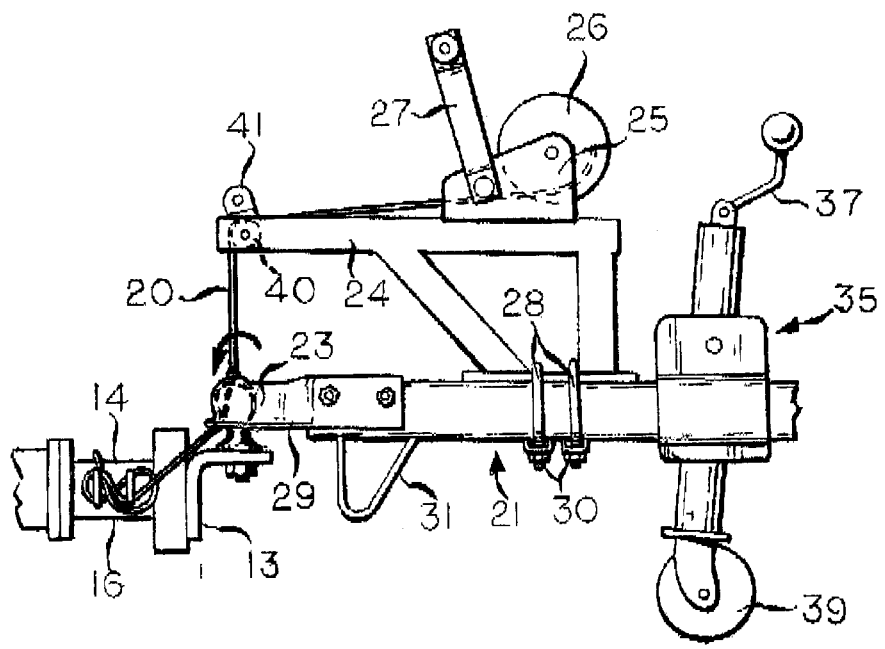
FIG. 3 is still another side elevational view similar to FIGS. 1 and 2 but with the coupling elements in fully seated engaged relation.

The method of coupling in accordance with the present invention is easily practiced with great efficiency. As shown in FIG. 1 the cable 20 is unwound from the winch 25 and first passed over the pulley 40 and then through the opening 23a in the upper portion of socket 23. The cable is then extended to the ball 10 on the towing vehicle and passed through the downwardly-angled opening 15 in the ball. The free end of cable 20 is then wrapped securely around the cleat member 16 on the draw bar 14. After the cable is secured to the towing vehicle, the hand crank 27 of the winch 25 is operated to draw the vehicles together. The space between the coupling members may be as great as 15 feet, for example, with the members substantially out of precise alignment. As shown in FIG. 2 as the cable is pulled by the winch, the ball is drawn closely adjacent to the socket. The cable 20 exerts both a lifting and alignment movement of the socket—initially mostly horizontally and then vertically. As shown in FIG. 3 the socket 23 is lifted up and over the ball 10 into precise alignment therewith. The cable is then relaxed slightly by the winch to allow the socket to be lowered over the ball in fully seated arrangement. The locking mechanism, where one exists, may then be operated to lock the coupling components together. The cable 20 may remain fully secured to the cleat 16 to provide an additional safety feature to the coupling.

To uncouple the device from the vehicles, the cable is first removed from the cleat 16 and withdrawn from the openings in both the ball and socket. The socket is then lifted vertically off the ball for separation of the coupling members. The trailer tongue can then be lowered to the ground or be supported by the jackwheel. Where the jackwheel does not exist, the tongue can be supported by the skid 31.

As stated, the bracket 24 can be left in position mounted on the trailer tongue or be transferred to another vehicle to be towed. The openings in both the ball and socket as described are the major requirements for use of the coupling device and method of coupling with other vehicles to be towed. A cleat member should be mounted on the powered vehicle to secure the cable free end after the cable is passed through the socket and ball.

In the foregoing description, certain terms have been used for brevity, clearness and understanding; but no unnecessary limitations are to be implied therefrom beyond the requirement of the prior art, because such terms are used for descriptive purposes and are intended to be broadly construded.

Moreover, the description and illustration of the invention are by way of example, and the scope of the invention is not limited to the exact details shown or described. Various modifications may be resorted to within the spirit and scope of the appended claims.

What is claimed is:

1. An assembly in combination with a powered vehicle and an unpowered trailer vehicle for drawing together the powered vehicle and the unpowered trailer vehicle and placing them in coupling contact, comprising:
   a socket member fixedly mounted on a forward portion of said unpowered trailer, said socket member having a continuous opening in an upper portion thereof;

a winch mounted on a rearward portion of said unpowered trailer vehicle;

a ball member fixedly mounted on a rearward portion of said powered vehicle, said ball member having a downwardly facing angular opening extending through a spherical upper portion thereof;

cable gripping means rigidly mounted on a rearward portion of said powered vehicle adjacent to and below said ball member for gripping a winch cable, said gripping means comprises said winch cable being tied to a cleat;

said winch cable extending from said winch downwardly through said continuous opening in said socket member and downwardly through said angular opening in said ball member to said gripping means to be gripped thereby, whereby drawing of said cable by said winch draws said socket member and said ball member together into coupling contact;

said winch is releasably mounted on said unpowered trailer vehicle; and release of said winch cable from said gripping means and said winch from said unpowered trailer vehicle allows removal of said winch and winch cable from said unpowered trailer vehicle.

* * * * *